E. J. KREIS.
REINFORCING DEVICE FOR PNEUMATIC TIRES.
APPLICATION FILED JULY 19, 1916.
1,229,096.
Patented June 5, 1917.
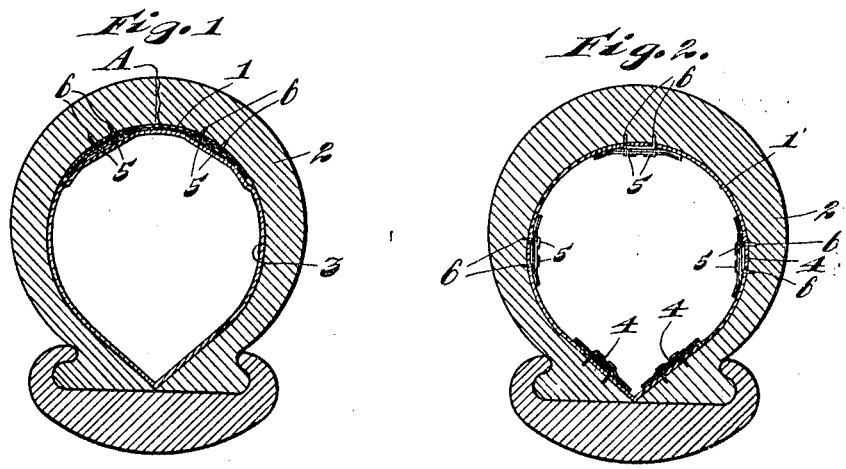
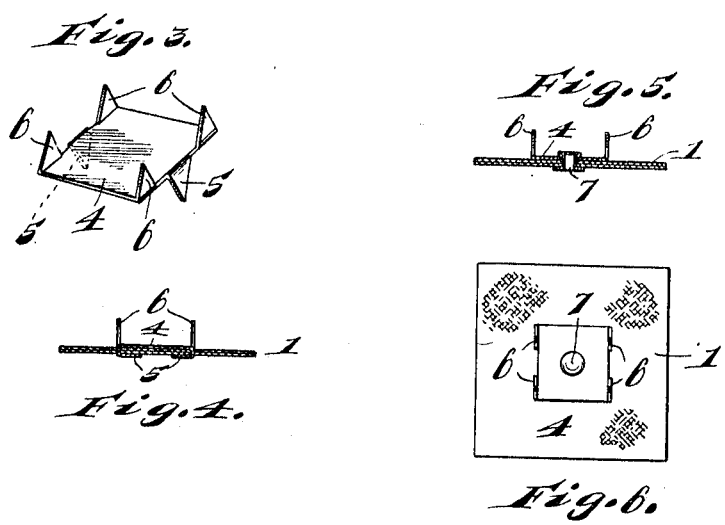
Witnesses:
C. E. Wessels
B. J. Richards
Inventor:
Emil J. Kreis,
By Joshua R. H. Topp
his Attorney.

UNITED STATES PATENT OFFICE.

EMIL J. KREIS, OF MENDOTA, ILLINOIS.

REINFORCING DEVICE FOR PNEUMATIC TIRES.

1,229,096.

Specification of Letters Patent.

Patented June 5, 1917.

Application filed July 19, 1916. Serial No. 110,033.

*To all whom it may concern:*

Be it known that I, EMIL J. KREIS, a citizen of the United States, and a resident of the city of Mendota, county of Lasalle, and State of Illinois, have invented certain new and useful Improvements in Reinforcing Devices for Pneumatic Tires, of which the following is a specification.

My invention relates to improvements in reinforcing devices for pneumatic tires, and has for its object the production of a device of this character which will be capable of effectively reinforcing a pneumatic tire casing, one which may be readily and easily arranged in operative position, and one which will be of durable and economical construction.

Other objects will appear hereinafter.

The invention consists in the combinations and arrangements of parts hereinafter described and claimed.

The invention will be best understood by reference to the accompanying drawings forming a part of this specification, and in which, Figure 1 is a transverse section through a pneumatic tire equipped with a reinforcing device embodying the invention, Fig. 2 is a view similar to Fig. 1, illustrating a slightly modified form of construction, Fig. 3 is a perspective view of one of the gripping members employed in the construction, Fig. 4 is a transverse section through the device illustrating the method of securing the gripping members in place, Fig. 5 is a view similar to Fig. 4, illustrating a slightly modified form of construction for securing the gripping members in position, and Fig. 6 is a top plan view of the construction shown in Fig. 5.

The form of construction illustrated in Fig. 1 is designed for use particularly in reinforcement of a tire casing after a blow-out or puncture has occurred. This form of the device consists of a thin flat flexible body 1 in the form of a patch, said body consisting preferably of a plurality of thin flat sections or sheets of asbestos arra; one upon the other. Said body 1 is ad  $_{\rho \iota}$  t to be inserted between the tire casing 2 and the inner tube 3 of the tire, or between the former and the conventional liner with which some tires are equipped, the device being located directly below or in registration with the ruptured portion of the tire, as indicated at A in Fig. 1. The body 1 is provided at intervals with gripping devices, each of which consists of a thin flat metallic plate 4 upon which are formed integral pointed ears 5 which are adapted to extend through the body 1, and be clenched upon the reverse side thereof, as clearly shown in Fig. 4. Also formed upon the plate 4 is a plurality of pointed ears 6 which are adapted to pierce the tire casing, thereby adapting the body 1 to serve as a reinforcement for the weakened portion of the tire so as to prevent further rupturing of the tire at this point. The employment of ears 5 which pierce the body of the reinforcing member and which are clenched at the reverse side thereof, results in an exceedingly firm connection between the gripping members and said body which prevents any tilting of the gripping members, such as might otherwise result when the tire casing is in use and under tremendous strain, thereby precluding the possibility of the points 6 being turned inwardly into the air tube and puncturing the same, as might otherwise result.

If desired the gripping members may be used in connection with a member 1' in the form of a liner for the tire casing, as shown in Fig. 2, said gripping members, in this case, preventing any shifting or relative movement of the liner, thus serving to prevent heating of the tire, such as otherwise results through friction occasioned by the shifting of a liner in the tire casing. The liner 1' is preferably formed of a plurality of layers or sheets of asbestos, the same as the member 1 before described. The asbestos of course prevents the conduction of heat from the tire casing to the air tube, and thus helps to prevent blow-outs, such as result from increased pressure due to expansion of the air in a tire when heated. In addition to the locking of the layers or sections of the members 1 and 1' together by means of the gripping members, the same may also be cemented together, if desired.

In the form shown in Figs. 5 and 6, the ear 5 of the gripping member has been dispensed with and in lieu thereof a rivet 7 employed for fastening the same to the body 1.

While I have illustrated and described the preferred forms of construction for carrying my invention into effect, these are capable of variation and modification without departing from the spirit of the invention, I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with a pneumatic tire comprising an outer casing, of a reinforcing element adapted for coöperation with said casing, said element consisting of a thin durable flexible body adapted to lie against the casing; gripping members arranged on said body; pointed ears on each of said members extending through said body and clenched at the reverse side thereof; and pointed ears on each of said members extending in the opposite direction adapted to pierce the tire casing, substantially as described.

2. The combination with a pneumatic tire comprising an outer casing, of a reinforcing element adapted for coöperation with said casing, said element consisting of a thin durable flexible body adapted to lie against the casing; metallic gripping members arranged on said body; integral pointed ears on each of said members extending through said body and clenched at the reverse side thereof; and integral pointed ears on each of said members extending in the opposite direction adapted to pierce the tire casing, substantially as described.

In testimony whereof I have signed my name to this specification in the presence of two subscribing witnesses.

EMIL J. KREIS.

Witnesses:
   JNO. R. WOODS,
   F. P. MCKEAN.